Figure 1:
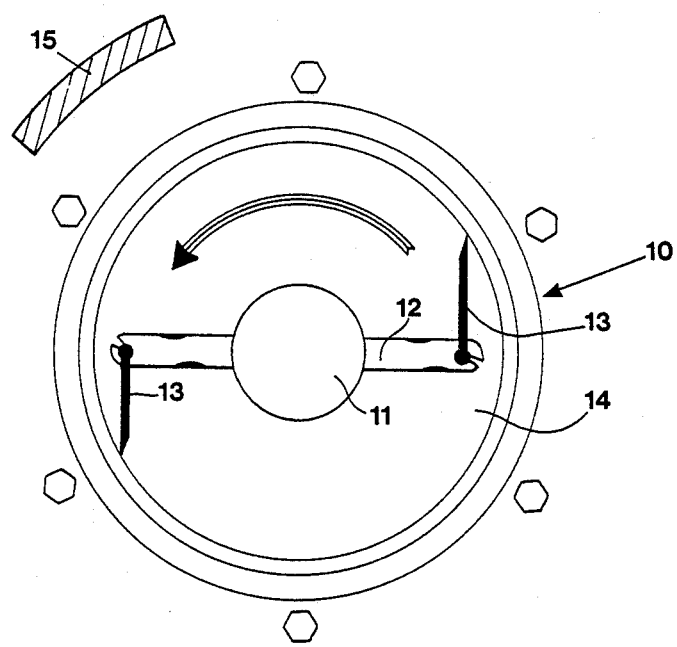

United States Patent [19]

Odelstam

[11] Patent Number: 4,858,682
[45] Date of Patent: Aug. 22, 1989

[54] CYLINDER FOR HEAT EXCHANGERS

[75] Inventor: Carl T. Odelstam, Sandviken, Sweden

[73] Assignee: Sandvik AB, Sandviken, Sweden

[21] Appl. No.: 120,536

[22] Filed: Nov. 13, 1987

[30] Foreign Application Priority Data

Nov. 17, 1986 [SE] Sweden ................................ 8604906

[51] Int. Cl.$^4$ ............................................. F28D 11/06
[52] U.S. Cl. ........................................ 165/84; 165/94; 165/179; 165/180; 165/905; 138/38
[58] Field of Search ................. 165/84, 180, 177, 186, 165/146, 905, 76, 179; 428/683; 420/68, 46; 138/38

[56] References Cited

U.S. PATENT DOCUMENTS 3,847,212 11/1974 Withers, Jr. et al. ................ 165/179
4,073,339 2/1978 D'Orsay ................................ 165/94
4,119,765 10/1978 Pinnow et al. .................... 420/68 X
4,546,819 10/1985 O'Connor ........................ 165/179 X Primary Examiner—Larry Jones
Attorney, Agent, or Firm—Burns, Doane, Swecker & Mathis

[57] ABSTRACT

The present invention relates to a cylinder tube for scraped surface heat exchangers the interior surface (18) of which is even and the exterior surface of which is enlarged by providing a number of spaced grooves (16) with a smoothly rounded bottom portion, the profile depth (A) of which being substantially larger than the radius (R) at the bottom of said groove (16). The cylinder tube (10) shall be manufactured by a duplex stainless steel alloy consisting of the following constituents in weight-%; max 0.03% C, 18-30% Cr, 4-8% Ni, 0-6% Mo, 0.5-2% Mn, 0.5-2% Si, 0.05-0.30% N, the remainder Fe and normal impurities, whereby the amounts of the constituents are interrelated such that the amount of ferrite in the microstructure amounts to 35-65%.

18 Claims, 1 Drawing Sheet

U.S. Patent     Aug. 22, 1989     4,858,682

CYLINDER FOR HEAT EXCHANGERS

The present invention relates to a hollow cylinder for use in a scraped surface heat exchanger for chilling or heating fluid, half fluid or highly viscous products. Inside this cylinder the product is pressed from one end of the cylinder towards the other end whilst said product is being scraped towards the interior walls of said cylinder and whilst the cylinder is subjected to heating or cooling on its exterior surface.

A necessary condition for such a heat exchanger to function properly in producing an acceptable product, often food, is that the interior surface of said cylinder is so even that the scraper blades do not interfere therewith or the product is being contaminated, and, further, that the thermal conductivity of the exterior surface is good. The cylinder must be able to withstand contact with both said product and also with cleaning liquids as well as being wear resistant towards the scraper blades. The material presently being used in such cylinders is nickel, chromium plated nickel and chromium plated carbon steel, the interior surface of which often becomes uneven due to pitting damages which reduce the lifetime of such cylinders.

Especially the chromium plated cylinders are susceptible of aggression due to porosities in the chromium plated zone through which the underneath material can be subject of aggression. In view thereof it would be desirable to use a homogeneous cylinder material without a chromium plating zone. Cylinders of pure nickel metal without a chromium plating would be a possible solution but its wear resistance and its corrosion resistance towards certain products and certain cleaning liquids is too low. Further, the scraper blades might rip off small nickel particles that will contaminate the product and might also cause nickel allergy. A cylinder made of homogeneous stainless steel would be able to eliminate aggression from said product but its wear resistance towards the scraper knife blades is mostly insufficient and, further, its thermal conductivity is worse than for those materials presently used. Therefore, such type of cylinders would not be practically useful.

It is a purpose of the invention to eliminate the above related problems by providing a cylinder having a unique combination of cylinder material and cylinder design. Therefore, a duplex stainless steel is selected with high strength and very good resistance towards pitting damages from transmitted products and cleaning liquids. This selection of material enables a thinner cylinder wall thickness to be used. Simultaneously, the exterior surface of the cylinder has been given a special form so as to provide an increased heat transfer. The cylinder of the present invention therefore has very good heat transfer combined with highly improved resistance to pitting damages whilst also having an improved wear resistance towards scraper knife blades.

Figure 2:
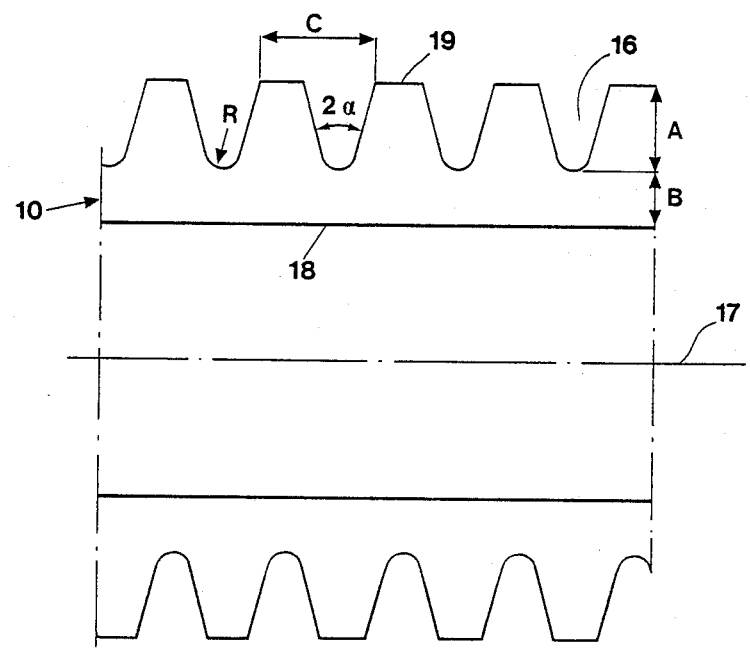

The invention will now be described more in detail with reference to the accompanying drawings in FIG. 1 is a cross section of a scraped surface heat exchanger of conventional design, FIG. 2 is an enlarged longitudinal section of a preferred embodiment of a cylinder of the present invention intended for use in a scraped surface heat exchanger.

In FIG. 1 a hollow cylinder 10 of tubular shape is provided from the inlet end of which a viscous medium, such as margarine, is to be pressed through the cylinder to its outlet end. A rotor 11 is rotatably mounted in the cylinder 10, said rotor 11 having a radial extension 12 at which a scraper knife blade 13 is fastened. The scraper knife blades 13 are intended, whilst rotated and axially displaced, to scrape off the fluid or viscous medium from the interior surface of the cylinder 10. The viscous medium is transmitted forwardly through the space 14. It is of great importance that the interior surface of this cylinder 10 is even and finely polished in order to enable good scraping efficiency and good cleanness. An exteriorly provided heating source 15 is arranged to transmit desired temperature to the exterior surface of the cylinder 10.

In accordance with the invention the exterior surface of the cylinder 10 has been provided with grooves 16 similar to a thread contour, see FIG. 2, which design has been selected for cylinders to be used in horizontally oriented heat exchangers. Alternatively these grooves 16 can be provided as concentrical grooves. These grooves should preferably have a uniform profile depth A. Each such groove 16 shall have a smoothly rounded bottom portion in order to eliminate the risk for fatigue cracks due to the high product pressure. The radius R at the bottom of said groove 16 should be 0.4–1.0 mm. The flank portions should have a straight contour and the flank angle $\alpha$ should be 10°–30° measured in relation to a normal with regard to the center axis 17 of said cylinder 10. The depth A of the groove 16 depends on the strength of the selected cylinder material and should be 3–5 mm for a cylinder diameter in the range 100–300 mm whilst the wall thickness B from the bottom of the groove 16 to the interior surface 18 of the cylinder should be 2.5–5 mm. The general dimensioning rule is that the size of the depth A of said groove 16 should be essentially larger than the size of the bottom radius R of same groove 16.

The top portions 19 of the exterior profile could either be flat as shown in FIG. 2, or somewhat rounded or even peaky. If said top portion 19 is rounded its radius should preferably be of same size as the radius R at the bottom of the groove 16. The pitch C between adjacent grooves 16 should be 0.1–10 mm, preferably 1.5–10 mm. If a thread contour is selected the thread pitch should be in the range 1°–50°. By optimizing the design of the exterior surface of the cylinder 10 as described above it has been possible to achieve 75–100% surface enlargement in comparison with a cylinder having an even exterior surface where the external diameter is measured from the bottom of said grooves 16.

For cylinders to be used in vertically oriented installations the grooves 16 can be applied longitudinally on the exterior surface of the cylinder 10. In accordance with an alternative embodiment these grooves can be applied like a thread contour oriented at an angle of 40°–50° in relation to the longitudinal axis of said cylinder.

The material to be selected for the manufacture of the cylinder 10 shall be a duplex stainless steel alloy with ferritic-austenitic microstructure and with a strictly optimized chemical analysis. The steel alloy should have an analysis comprising, in weight-%, max 0.03% C, 18–30% Cr, 4–8% Ni, 0–6% Mo, 0.5–2% Mn, 0.5–2% Si, 0.05–0.30% N the remainder being Fe and normally occurring impurities, whereby the amounts of said constituents should be selected such that the ferrite content amounts to 35–65%.

By selecting the above mentioned type of material it will be possible to achieve high hardness and good wear resistance towards the scraper knife blades 13 whilst also achieving improved corrosion resistance. This will give a better protection towards salt containing media such as margarine and cleaning media than compared with conventional tubes of chromium plated carbon steel the interior surface of which is too porous. The strength of such improved duplex material is about double as high as that of regular stainless steels type, SIS 2343. Thanks to this essential improvement of the strength in the selected duplex material in comparison with previous steels it has been possible to make the wall thickness of the tubular cylinder 10 much thinner. This has further enabled a more substantial profile depth of said grooves 16 which will compensate for the somewhat lower thermal conductivity of said duplex material in comparison with previous carbon steels.

In a preferred embodiment of the invention the flank angle α was selected to be 17.5°, the profile depth A of the groove 16 was 4.6 mm and the wall thickness B at the bottom of said groove 16 was 2.9 mm. The radius R was 0.8 mm and the pitch C was 5.6 mm. As a general recommendation it has been found that the profile depth A should be at least three times larger than the radius R and preferably four times larger than the Radius R at the bottom of the groove 16.

What is claimed:

1. Cylinder tube for use in a scraped surface heat exchange where fluid, half fluid or viscous products are pressed through said tube from one end to the other while being chilled or heated by means of a cooling or heating medium applied towards the exterior surface of said cylindrical tube, characterized in the following, in combination,
   (a) the cylinder tube is made of a duplex ferrite-austenite steel alloy comprising in weight-% max 0.03% C, 18-30% Cr, 4-8% Ni, 0-6% Mo, 0.5-2% Mn, 0.5-2% Si, 0.05-0.30% N and the remainder being Fe and usual impurities, whereby the amounts of these constituents are selected such that the ferrite content is 35-65%, and
   (b) the cylinder is in the shape of a tube with an even interior surface, the exterior surface of which is provided with a plurality of spaced grooves with a profile the bottom of which is smoothly rounded at a radius (R) whereby the profile depth (A) of each said groove is essentially larger than said radius (R).

2. Cylinder tube as defined in claim 1, characterized in that the grooves each comprises straight flanks, the flank angle of which is 10°-30° measured in relation to a normal to the longitudinal axis of said cylinder.

3. Cylinder tube as defined in claim 1, characterized in that the pitch (c) between the grooves is 0.1-10 mm.

4. Cylinder tube as defined in claim 3, wherein the pitch (C) between the grooves is 1.5-10 mm.

5. Cylinder tube as defined in claim 1, characterized in that the radius (R) at the bottom of each groove amounts to 0.4-1.0 mm.

6. Cylinder tube as defined in claim 1, characterized in that the top portions of the profile are smoothly rounded having the same radius 0.4-1.0 mm as the bottom radius (R) of said grooves.

7. Cylinder tube as defined in claim 1, characterized in that the profile depth (A) of the groove is at least three times larger than the radius (R) at the bottom of said groove.

8. Cylinder tube as defined in claim 7, characterized in that the profile depth (A) of the groove is at least four times larger than the radius (R) at the bottom of said groove.

9. Cylinder tube as defined in claim 1, characterized in that the top portions of the recessed profile are flat.

10. Cylinder tube as defined in claim 1, characterized in that the wall thickness (B) at the bottom of each groove is 2.5-5.0 mm with a cylinder diameter of 100-300 mm.

11. Cylinder tube as defined in claim 1, characterized in that the grooves are provided as concentrical recesses around the mantle surface of the cylinder.

12. Cylinder tube as defined in claim 1, characterized in that the grooves are provided with a thread contour with a thread pitch of 1°-50°.

13. Cylinder tube as defined in claim 12, characterized in that the grooves are provided with a thread pitch of 40°-50°.

14. Cylinder tube as defined in claim 1, characterized in that the grooves are straight and extending in the longitudinal direction of the cylinder.

15. Cylinder tube as defined in claim 1, characterized in that the radius (R) at the bottom of the groove amounts to 0.4-1.0 mm with a cylinder diameter of 100-300 mm.

16. Cylinder tube as defined in claim 1 characterized in that the profile depth (A) amounts to 3-5 mm for interior cylinder diameters of 100-300 mm.

17. Cylinder tube as defined in claim 1, characterized in that the profile depth (A) of said grooves is larger than the wall thickness (B) at the bottom of said groove.

18. In a cylinder tube used in a scraped internal surface heat exchanger where viscous products are passed through said tube from one end to another while being heated or cooled with the product being scraped by a plurality of scraper knife blades from the internal surface of said heat exchanger, the improvements which comprise providing on the exterior surface of the said cylinder a plurality of spaced grooves with rounded bottoms, the profile depth of said grooves being greater than the radius of the bottom of the grooves and having the composition of the cylinder tube being a duplex ferritic-austenitic microstructure stainless steel alloy comprising 0.03% C max, 18-30% Cr, 4-8% Ni, 0-6% Mo, 0.5-2% Mn, 0.5-2% Si, 0.05-0.30% N, remainder being Fe and usual impurities, with the amount of ferrite in the microstructure being from 35 to 65%.

* * * * *